June 3, 1924.
E. W. DAVIS
LUBRICATING SYSTEM
Filed Oct. 28, 1920
1,496,209
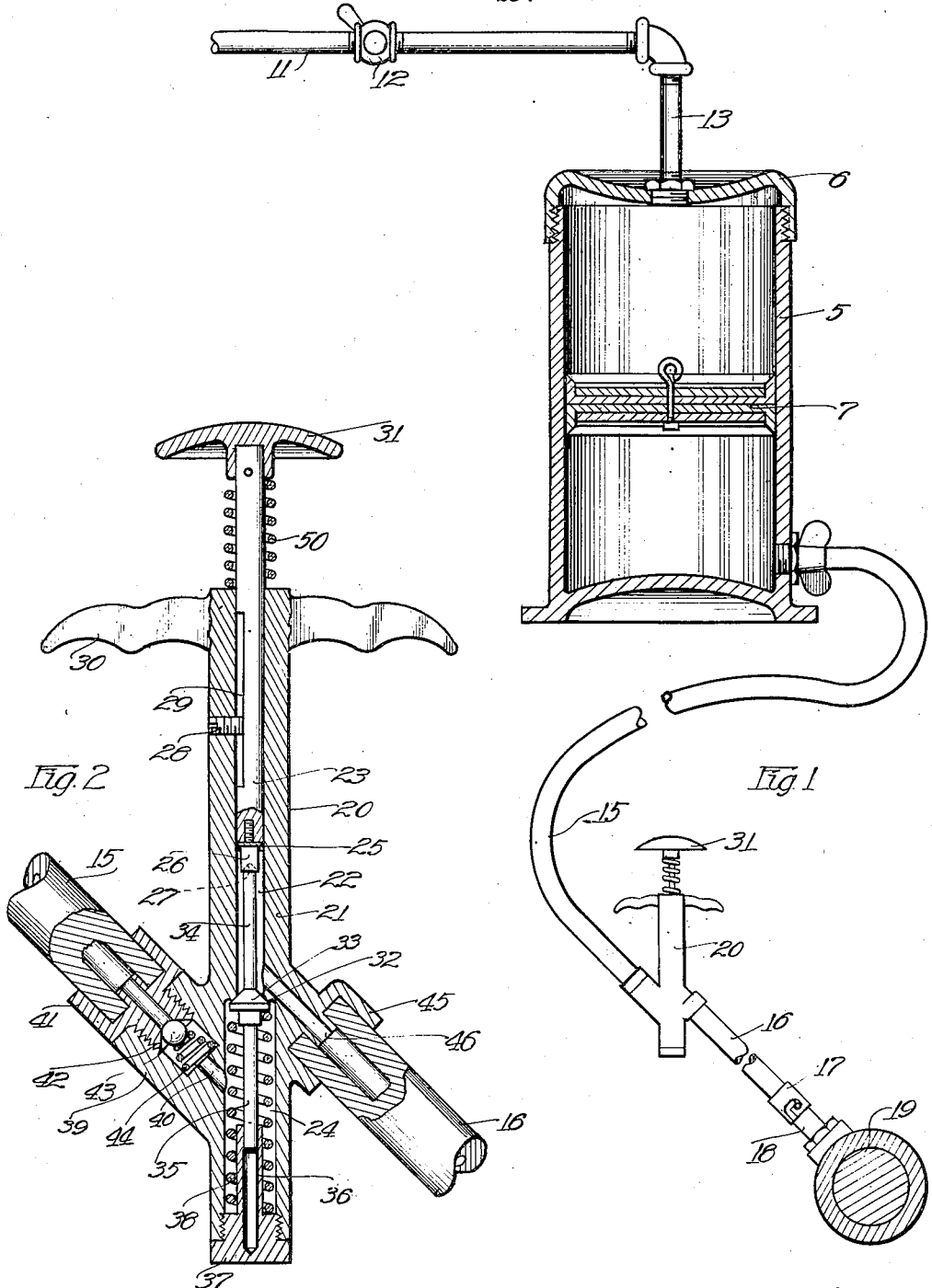
Inventor
Ernest W Davis Patented June 3, 1924.

1,496,209

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed October 28, 1920. Serial No. 420,157.

*To all whom it may concern:*

Be it known that I, ERNEST W. DAVIS, a citizen of the United States, and resident of Oak Park, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems, and is especially concerned with improvements in lubricating systems of that type in which the bearings to be lubricated are each provided with a lubricant receiving member or nipple, to which the lubricant is supplied under pressure by means of a compressor having a discharge conduit, provided with a coupling member for successively making a detachable connection with each of said lubricant receptacles or nipples.

The objects of my invention are

1st. To provide a system of the character described, comprising a source of lubricant subjected to continuous pressure, and a coupling member for connecting said source of lubricant with the nipples or lubricant receptacles, so constructed that it is not necessary to relieve the pressure on the lubricant in the compressor to make it possible to detach the coupling member from the nipples.

2nd. To provide means intermediate the compressor and the coupling member, whereby the pressure of the lubricant in the coupling member can be either increased above the pressure developed in the compressor or entirely relieved.

3rd. To provide a system of the character described, comprising a pump located intermediate the compressor and the coupling member, so constructed that it can be actuated to permit an uninterrupted flow of lubricant from the compressor to the bearing, where the pressure developed in the compressor is sufficient to force the lubricant between the bearing surfaces, and of such construction that where the pressure developed in the compressor is insufficient to force the lubricant between the bearing surfaces the pump can be used for increasing the pressure upon the lubricant supplied to the bearing as desired.

4. To provide a pump of novel construction.

5. To provide a construction of the character described, which is simple in construction, easy to operate, reliable, and economical to manufacture.

Other objects will appear as this description progresses, reference being had to the accompanying drawings, in which Figure 1 is a view partially in section, and partially in elevation, showing certain details of construction of my improved system of lubrication, portions of the apparatus being broken away, and Figure 2 is a central longitudinal section through the improved pump, which forms a part of my lubricating system.

Throughout both views, similar reference characters will be used to refer to similar parts.

In Figure 1, I have shown the details of construction of a lubricant compressor, which may form a part of my improved lubricating system, although it is to be clearly understood that any type of compressor can be used for maintaining the lubricant under continuous pressure. The particular compressor illustrated comprises a cylinder 5 for receiving the lubricant, the head 6 of this cylinder being removable for refilling the cylinder. The lubricant is maintained under pressure by means of the piston 7 against which air, under comparatively low pressure, is admitted in the cylinder 5 through the supply pipe 11, the valve 12 and pipe 13. The piston 7 is provided with the member 8 and when it is desired to refill the cylinder 5, the head 6 is removed and the piston is withdrawn by means of a hook. The oil or grease then may be poured or inserted in the open end of the cylinder.

A flexible discharge conduit comprising the two sections 15 and 16 is connected with the cylinder 5, the free end of the section 16 being provided with a coupling member 17, which co-acts with the nipple 18 secured to a bearing 19 to provide a detachable connection between the discharge conduit, and the nipple 18. The coupling member 17 and the nipple 18 may be similar in construction to the corresponding elements illustrated and described in the patent of Arthur V. Gullborg, No. 1,307,734, of June 24, 1919. My invention is not, however, limited to the use of a nipple, and coupling member of the construction shown in this patent, but may embody any arrangement of parts for making a detachable connection with the bearing to be lubricated of such character that the lubricant can be forced into the bearing under pressure.

The adjacent ends of the two sections 15 and 16 of the discharge conduit are connected by means of a pump, indicated in general by the reference character 20, said pump comprising a body member 21 having a bore extending therethrough, one end 22 of which forms a cylinder in which is slidably mounted the plunger 23, and the other end of which is enlarged to provide a valve chamber 24.

The inner end of the plunger 23 is provided with a cup leather or gasket 25 for preventing the escape of lubricant past the inner end of the plunger, the cup leather 25 being held in position by means of a screw 26 having an elongated head, the outer end of which is provided with a conical depression 27, the function of which will be referred to later on in this description. A set screw 28, the inner end of which projects into a groove 29, formed in the side of the plunger 23, co-acts with the ends of the groove for limiting the inward and outward strokes of the plunger. The body member is provided with finger grips 30 and the outer end of the plunger is provided with a hand grip 31, the finger grips and hand grip being so located that they can be grasped by hand and thus make it comparatively easy to force the plunger 23 inwardly.

A valve seat 32 is formed at the junction of the cylinder and the valve chamber for co-acting with the valve 33 to prevent the passage of lubricant from the valve chamber 24 into the cylinder. This valve is provided with a rod-like extension 34, the end of which is conically formed to be received in the conical depression 27 of the head of the screw 26, previously described. The valve 33 is supported by a rod 35, which reciprocates in a longitudinally extending bearing tube 36, which extends inwardly from the cap 37, closing the outer end of the valve chamber 24. A compression spring 38 extends between the cap 37 and the valve 33 and tends to yieldingly hold the valve on its seat.

The body member 21 is provided with an angularly extending boss 39 in which is formed an inlet passageway 40, one end of which communicates with the valve chamber 24, and the other end of which is connected by means of the union or coupling member 41 with the outer end of a section 15 of the discharge conduit. The inner end of the union 41 is provided with a valve seat 42 for receiving a check valve 43, which is yieldingly held in place by a suitable spring 44.

The body member 21 is likewise provided with a second angularly extending boss 45, having an outlet passageway 46 formed therein for establishing communication between the cylinder 22 and the inner end of the section 16 of the discharge conduit.

To use my improved lubricating system the cylinder 5 is first filled with lubricant, the head 6 replaced, and the valve 12 positioned to permit the compressed air to flow into the upper end of the cylinder 5. The lubricant in the cylinder 5 is thereby placed under pressure, and forced through the section 15 of the discharge conduit, past the check valve 43 and neglecting the small amount of air which may be trapped therein completely fills the valve chamber 24. The operator then connects the coupling member 17 with a nipple to be supplied with lubricant, and grasping the finger grips 30 and the hand grip 31 with one hand forces the plunger 23 inwardly whereupon the lubricant flows into the cylinder and out through the passageway 46, the section 16 of the discharge conduit, and the coupling member 17, displacing the air from these passageways, and eventually filling all of them with lubricant. The lubricant then passes into the nipple, and if the pressure upon the lubricant in the cylinder 5 is sufficient the lubricant will be forced into the bearing. If the pressure of the lubricant in the cylinder 5 is not sufficient to force the lubricant between the bearing surfaces, the operator releases the hand grip 31, whereupon the plunger 23 will be forced outwardly by the pressure of the lubricant and the cylinder 22 will be completely filled, the rod 34 preventing the closure of the valve 33 before the plunger 23 reaches the position shown in Figure 2. The operator then forces the plunger 23 inwardly, thereby displacing the lubricant in the cylinder through the outlet passageway 46 and the section 16 of the discharge conduit. The valve 43 prevents the reverse flow of the lubricant, and thus makes it possible to place the lubricant in the section 16 under high pressure by the use of the plunger 23. It will, of course, be understood that where the plunger 23 is to be operated by hand this diameter will be comparatively small, so that the application of a comparatively small force to the hand grip 31 will subject the lubricant in the section 16 of the discharge conduit and in the nipple to such pressures as may be required to force the lubricant into the bearing. By successively moving the plunger 23 inwardly and outwardly, the operator can force as much lubricant into the bearing as he may desire. When this stage has been reached, the operator releases the plunger 31, which moves outwardly under the pressure of the lubricant from the compressor. To relieve the pressure on the lubricant in a coupling member so that it may be detached from the nipple without any danger of the lubricant being forced from the coupling member, and lost, the operator withdraws the plunger 23 still further from the cylinder, thereby tending to create a vacuum in the upper end of the cylinder, which will tend to place the lubricant in the coupling member under suction rather than pressure, and thus prevent its discharge from the coupling member. It will, of course, be understood that the valve 33 prevents the lubricant in the valve chamber 24 from flowing into the cylinder to relieve the vacuum created as described. If desired, a spring 50 may be provided for urging the plunger 23 outwardly.

While I have described the details of the preferred embodiment of my invention, it is to be clearly understood that my invention is not limited to these details, but is capable of other adaptations and modifications within the scope of the appended claims.

Having thus described my invention, what I claim is:

1. A lubricating system comprising a lubricant receptacle, a source of lubricant under pressure, and means for supplying lubricant from said source to said receptacle, comprising a conduit having a coupling at one end for connecting with said receptacle and means connected with said conduit intermediate its ends for varying the pressure on the lubricant supplied to said receptacle, comprising a body member having a bore extending longitudinally therethrough, one end of said bore constituting a pump cylinder, the other end of said bore being enlarged to form a valve chamber, and a valve seat at the end of said cylinder, a valve mounted to reciprocate in said valve chamber, and seat on said valve seat, a spring tending to hold said valve on its seat, a plunger slidable in said cylinder, and provided with means for opening said valve upon the inward stroke of said plunger, the said body member being provided with an inlet passageway connecting with said valve chamber and connected by one part of said conduit with said source of supply, and an outlet passageway connected by the other part of said conduit with said coupling, and an outwardly closing check valve in said inlet passageway.

2. A lubricating system comprising a lubricant receptacle, a source of lubricant under pressure, and means for supplying lubricant from said source to said receptacle comprising a conduit having a coupling at one end for connecting with said receptacle and means connected with said conduit intermediate its ends for varying the pressure on the lubricant supplied to said receptacle, comprising a body member having a bore extending longitudinally therethrough, one end of said bore constituting a pump cylinder, the other end of said bore forming a valve chamber, and a valve seat at the end of said cylinder, a valve mounted to seat on said valve seat, means for holding said valve on its seat, a plunger slidable in said cylinder, and provided with means for opening said valve upon the inward stroke of said plunger, the said body member being provided with an inlet passageway connecting with said valve chamber and connected by one part of said conduit with said source of supply, and an outlet passageway connected by the other part of said conduit with said coupling, and an outwardly closing check valve in said inlet passageway.

3. The combination with a lubricant receptacle of means for supplying lubricant thereto, comprising a body member having a bore extending therethrough, one end of said bore forming a pump cylinder, and the other end thereof forming a valve chamber, a valve seat between said pump cylinder, and said valve chamber, a valve movable in said valve chamber, means for yieldingly holding said valve on said seat, a plunger slidable in said pump cylinder, the said plunger and valve being provided with co-acting means for determining the time of opening and closing the said valve, the said body member being provided with an inlet passageway for supplying lubricant to said valve chamber, and an outlet passageway communicating with said pump cylinder and check valve in said inlet passageway, and means for detachably connecting said outlet passageway with said lubricant receptacle.

4. The combination with a lubricant receptacle of means for supplying lubricant thereto, comprising a body member having a bore extending therethrough, one end of said bore forming a pump cylinder, and the other end thereof forming a valve chamber, a valve seat between said pump cylinder, and said valve chamber, a valve movable in said valve chamber, means for yieldingly holding said valve on said seat, a plunger slidable in said pump cylinder, means controlled by the movement of said plunger for determining the time of opening and closing the said valve, the said body member being provided with an inlet passageway for supplying lubricant to said valve chamber, and an outlet passageway communicating with said pump cylinder and check valve in said inlet passageway, and means for detachably connecting said outlet passageway with said lubricant receptacle.

5. The combination with a lubricant receptacle of means for supplying lubricant thereto, comprising a body member having a pump cylinder, a valve chamber formed therein, a valve seat between said pump cylinder and said valve chamber, a valve movable in said valve chamber co-acting with said seat, a plunger slidable in said pump cylinder, means controlled by the movement of said plunger for determining the time of opening and closing the said valve, the said body member being provided with an inlet passageway for supplying lubricant to said valve chamber, and an outlet passageway communicating with said pump cylinder and check valve in said inlet passageway, and means for detachably connecting said outlet passageway with said lubricant receptacle.

6. The combination with a lubricant receptacle of means for supplying lubricant thereto, comprising a pump having a cylinder, an inlet passageway and an outlet passageway, an inwardly opening valve in the outer end of said inlet passageway, an outwardly opening valve between said inwardly opening valve and said cylinder, a plunger slidable in said cylinder means controlled by the action of said plunger for opening and closing said outwardly opening valve, and means for connecting said outlet passageway with said receptacle, comprising a coupling for making a detachable connection therewith.

7. A pump having a cylinder, an inlet passageway and an outlet passageway, an inwardly opening valve in the outer end of said inlet passageway, an outwardly opening valve between said inwardly opening valve and said cylinder, a plunger slidable in said cylinder and means controlled by the action of said plunger for opening and closing said outwardly opening valve.

8. The combination with a lubricant receptacle of a pump comprising a cylinder, and inlet and outlet passageways for said cylinder, means for connecting said outlet passageway with said lubricant receptacle, comprising a coupling member for making a detachable connection with said lubricant receptacle, means for preventing the discharge of lubricant into said cylinder, means for rendering said last-named means inoperative, and means for varying the capacity of said pump cylinder.

9. The combination with a lubricant receptacle of a pump for supplying lubricant thereto, comprising a cylinder, a plunger slidable in said cylinder, a source of lubricant under pressure, means for conducting lubricant from said source to said pump, a valve for preventing return of lubricant to said source, a second valve for preventing the lubricant from passing into said cylinder, means for rendering said second valve inoperative to permit the flow of lubricant into said cylinder, and means for connecting said cylinder with said lubricant receptacle.

10. A pump comprising a cylinder having an inlet passageway communicating therewith, a plunger in said cylinder, two valves in said inlet passageway opening in opposite directions and means for opening one of said valves upon the inward movement of said plunger toward said valves.

11. A pump comprising a cylinder having an inlet passageway communicating therewith, a plunger in said cylinder, two valves in said inlet passageway opening in opposite directions and means for opening one of said valves upon the movement of said plunger toward said valves.

12. A pump comprising a cylinder having an inlet passageway communicating therewith, a plunger in said cylinder, and two valves in said inlet passageway opening in opposite directions.

In witness whereof, I hereunto subscribe my name this 25th day of May, 1920.

ERNEST W. DAVIS.

Witnesses:
ALBIN C. AHLBERG,
ANDREW F. WINTERCORN.